(12) United States Patent
Coulston et al.

(10) Patent No.: US 10,875,039 B1
(45) Date of Patent: *Dec. 29, 2020

(54) WIPING SOLUTION BAND DISPENSER

(71) Applicants: Sue A Coulston, Whetstone, AZ (US); David A Coulston, Whetstone, AZ (US)

(72) Inventors: Sue A Coulston, Whetstone, AZ (US); David A Coulston, Whetstone, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/711,701

(22) Filed: Dec. 12, 2019

Related U.S. Application Data

(63) Continuation-in-part of application No. 16/280,867, filed on Feb. 20, 2019, now Pat. No. 10,512,368, which is a continuation-in-part of application No. 15/484,418, filed on Apr. 11, 2017, now Pat. No. 10,238,243.

(60) Provisional application No. 62/322,170, filed on Apr. 13, 2016.

(51) Int. Cl.

| | |
|---|---|
| *A47K 5/00* | (2006.01) |
| *B05B 3/12* | (2006.01) |
| *A47K 5/12* | (2006.01) |
| *G07F 13/00* | (2006.01) |
| *G07F 17/18* | (2006.01) |
| *B05C 11/10* | (2006.01) |

(52) U.S. Cl.
CPC .............. *B05B 3/12* (2013.01); *A47K 5/1208* (2013.01); *A47K 5/1217* (2013.01); *B05C 11/1002* (2013.01); *G07F 13/00* (2013.01); *G07F 17/18* (2013.01)

(58) Field of Classification Search
CPC .. B05B 3/12; B05B 3/14; B05C 5/002; B05C 11/10; B05C 11/11; B05C 11/1002; A47K 5/1217; A47K 2010/3273
See application file for complete search history.

(56) References Cited

U.S. PATENT DOCUMENTS

| | | |
|---|---|---|
| 3,495,571 A | 2/1970 | Evans |
| 4,570,827 A | 2/1986 | Roggenburg et al. |
| 4,798,312 A | 1/1989 | Scheiber |
| 4,901,889 A | 2/1990 | Mitchell |
| 5,016,779 A | 5/1991 | Williamson |
| 5,248,066 A | 9/1993 | Olson et al. |
| 5,373,970 A | 12/1994 | Ophardt |
| 5,697,577 A | 12/1997 | Ogden |
| 5,716,692 A | 2/1998 | Warner et al. |

(Continued)

*Primary Examiner* — J C Jacyna
(74) *Attorney, Agent, or Firm* — Invention To Patent Services; Alex Hobson

(57) ABSTRACT

A wiping solution dispenser utilizes a motorized dispenser mechanism that moves a nozzle back and forth along a stroke to dispense a wide band of wiping solution onto toilet tissue. A motor may be coupled with a nozzle that moves back and forth or rotates about a pivot point to dispense a band of wiping solution. Wiping solution may be within a solution container that is configured for insertion into the dispenser housing and may be automatically ruptured by a puncture feature. A pump may force the wiping solution from the nozzle, or the solution may be gravity fed. A motion detector may be incorporated to control the actuation and dispensing of the solution. A near field communication transceiver may be used to receive payment before solution is dispensed.

17 Claims, 11 Drawing Sheets

(56) References Cited

U.S. PATENT DOCUMENTS

| | | | |
|---|---|---|---|
| 5,732,853 | A | 3/1998 | Ganzeboom et al. |
| 5,887,759 | A | 3/1999 | Ayigbe |
| 5,951,762 | A | 9/1999 | Shangold et al. |
| 6,152,330 | A | 11/2000 | Polan |
| 6,238,682 | B1 | 5/2001 | Klofta et al. |
| 6,346,153 | B1 | 2/2002 | Lake et al. |
| 6,347,724 | B1 | 2/2002 | Chen et al. |
| 6,457,893 | B1 | 9/2002 | Hamilton |
| 6,376,365 | B1 | 11/2002 | Rios |
| 6,497,345 | B1 | 12/2002 | Wilker et al. |
| 7,037,020 | B2 | 5/2006 | Neuendorf |
| 7,438,257 | B2 | 10/2008 | Kennard |
| 10,238,243 | B1 * | 3/2019 | Coulston ................. B05C 11/11 |
| 10,512,368 | B1 * | 12/2019 | Coulston ................ B65D 47/36 |
| 2007/0261159 | A1 | 11/2007 | Marks |
| 2008/0272206 | A1 * | 11/2008 | Barrett ..................... A47K 5/12 |
| | | | 239/282 |
| 2008/0273915 | A1 | 11/2008 | O'Connell et al. |
| 2010/0219206 | A1 * | 9/2010 | Ophardt ............... A47K 5/1207 |
| | | | 222/192 |
| 2012/0111885 | A1 | 5/2012 | Binderbauer et al. |
| 2014/0124531 | A1 | 5/2014 | Muderlak et al. |
| 2015/0196173 | A1 | 7/2015 | Hoefte et al. |
| 2015/0207795 | A1 | 7/2015 | Wentz et al. |
| 2015/0273513 | A1 * | 10/2015 | Buckalter ............ A47K 5/1217 |
| | | | 222/146.2 |
| 2015/0327730 | A1 | 11/2015 | McNulty et al. |
| 2015/0366416 | A1 | 12/2015 | Paulus |

\* cited by examiner

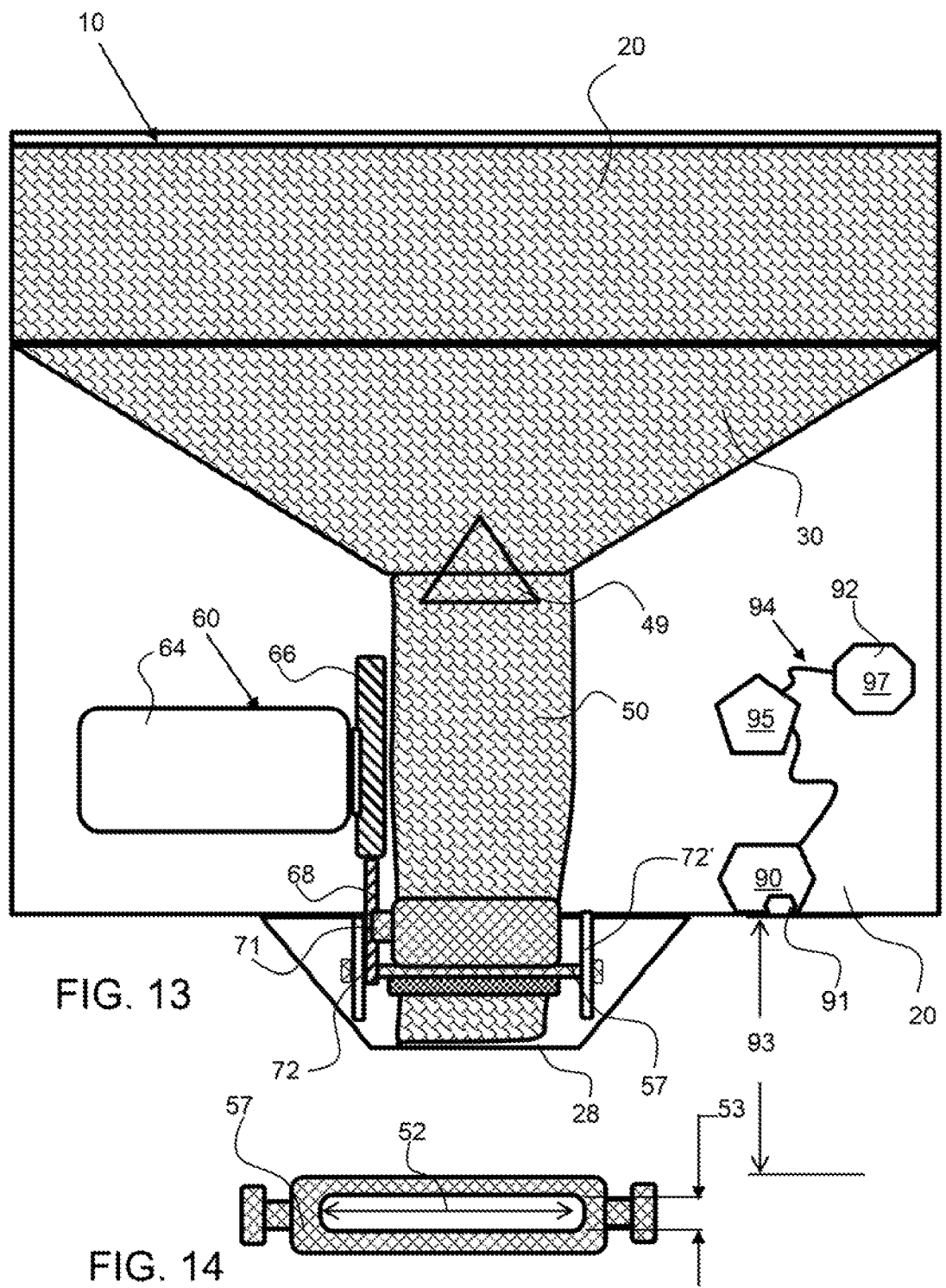

WIPING SOLUTION BAND DISPENSER

CROSS REFERENCE TO RELATED APPLICATIONS

This application is a continuation in part of U.S. application Ser. No. 16/280,867, filed on Feb. 20, 2019 and currently pending, which is a continuation in part of U.S. application Ser. No. 15/484,418, filed on Apr. 11, 2017, and now issued as U.S. Pat. No. 10,238,243 on Mar. 26, 2019 and entitled Wiping Solution Band Dispenser, which claims the benefit of U.S. provisional patent application No. 62/322,170, filed on Apr. 13, 2016 and entitled Hygiene Solution Band Dispenser; the entirety of all applications above are hereby incorporated by reference herein.

BACKGROUND OF THE INVENTION

Field of the Invention

The Invention relates to wiping solution dispensers and particularly those that dispense a wide band of wiping solution onto toilet tissue.

Background

Many people have turned to using disposable bathroom wipes for cleaning after using the bathroom, such as after urinating or having a bowel movement. The wipes are a tissue product having a wiping solution soaked into the tissue. The wipes are heavier in weight than toilet paper and cause problems for plumbing and especially septic systems, as they take much longer to break down than toilet paper, when they are biodegradable. Some wipes are not biodegradable as they container polymeric fibers and wreak havoc on plumbing and waste treatment facilities and/or septic systems. Wipes containing polymer fibers that do not break down can also cause harm to wildlife, such as sea turtles that mistake them for natural food products.

In addition, disposable wipes can quickly dry out if they are not enclosed in a sealed container. Some disposable bathroom wipes are placed in pop-up containers, having a lid and a slot for retrieving the bathroom wipes. The wipes routinely fall out of the slot and back into the container making it difficult to retrieve a single wipe. Furthermore, removing wipes from a container can lead to cross-contamination between users, wherein each user must open and touch the container to remove a wipe or wipes.

There exists a need for a bathroom dispenser that can provide a wide band of wiping solution onto toilet tissue or paper without requiring opening or touching a dispenser or container. The dispenser would eliminate the need for carrying disposable bathroom wipes and would prevent plumbing issues from the use of heavier weight disposable wipes.

SUMMARY OF THE INVENTION

The invention is directed to a wiping solution dispensers and particularly those that dispense a wide band of wiping solution onto toilet tissue. An exemplary wiping solution dispenser is touchless, wherein the band of wiping solution is activated by a motion sensor. An exemplary wiping solution dispenser utilizes a motorized dispenser mechanism that moves a nozzle back and forth to dispense the wiping solution. The nozzle opening is substantially sealed at either end of the stroke of movement by a closure feature, such as a closure stopper that extends up into the nozzle opening. An exemplary wiping solution dispenser is configured to receive a wiping solution within a receptacle and the solution is transferred down through a nozzle port into a nozzle. A wiping solution container, such as a carton or bag, may be configured for placement into the solution receptacle and may comprise a portion configured to couple with the nozzle port. In addition, the housing of the wiping solution dispenser may be configured with a puncture feature that penetrates through a solution container upon insertion to begin the flow of solution from the solution container.

An exemplary wiping solution dispenser comprises a housing that is configured to hold a volume of wiping solution and dispense it are required. An exemplary housing has a length, width or depth, and height that make it suitable for installation within a bathroom stall. For example, the length and height may be no more than about 20 cm, no more than about 30 cm and the like. The width or depth, the distance the wiping solution dispenser will extend out from a wall or bathroom stall panel may be no more than about 7 cm, no more than about 10 cm, no more than 15 cm and any depth between and including the depths provided. The receptacle within the housing configured to retain a volume of wiping solution for dispensing may have a volume of about 250 ml or more, about 500 ml or more, about 1 liter or more, about 1.5 liter or more, about 2 liters or more and any volume between and including the volumes provided. In a high volume application, such as at a stadium for example, a larger sized wiping solution dispenser and solution receptacle volume may be required. In higher volume applications, the wiping solution may be poured into the wiping solution dispenser and in lower volume applications a solution container may be used, as described herein.

A wiping solution container, such as a carton or bag, may be configured for placement into the solution receptacle. The shape of a carton may be configured to fit within the solution receptacle and the carton may have a frangible cover that extends over a solution port. A solution port may couple with the nozzle port to provide a flow of wiping solution from the container into the nozzle. A frangible cover may be a cover that can be peeled off or more preferably is a cover that in punctured when the solution container is inserted into the solution receptacle. A puncture feature, such as a sharp protrusion from the housing may automatically puncture the frangible cover under the weight of the liquid container. A puncture feature may be a sharp point that extends up from the nozzle port, for example. A bag may also be used as a solution container and the bag may be configured with a solution port or may be configured to be punctured anyplace along the bag upon insertion.

The wiping solution is configured to flow from the solution receptacle down into the nozzle. The nozzle may be coupled with the solution container, or may be affixed to the wiping solution dispenser housing, wherein solution flows from the solution receptacle into the affixed nozzle. The nozzle extends down from the nozzle port to an extended end and a nozzle opening. A nozzle opening may be configured to dispense a band of wiping solution. A band of solution is important as it enables suitable coverage of folded toilet tissue which allows the wiping solution to substantially uniformly cover the toilet paper. A dispenser that just dispenses in a single location and does not have an actuating dispensing end, will cause a pile or buildup of solution in one location and may not wick or expand out to a suitable area for cleaning purposes. This single point dispensing may saturate the toilet issue and cause it to become weak and tear. Also, a high concentration of the wiping solution in one location may wick through the bundle of tissue and wet the user's hand. In addition, a pile of wiping solution may be uncomfortable as well as messy when using to toilet paper to clean after using the bathroom. Standard toilet paper has a width of about 10 cm and therefore a dispenser that dispenses a band that is no more than 10 cm in both length and width may be preferred. A band of wiping solution may have a length and/or a width of at least about 1.5 cm, at least about 2.5 cm, at least about 5 cm, at least about 7.5 cm, or at least about 10 cm, and any range between and including the solution band widths provided. In an exemplary embodiment, the band of wiping solution is about 5 cm by 5 cm, as this provides good coverage for a square of standard toilet paper. Dispensing the wiping solution in a band will eliminate the drawbacks of a single point dispensing as described herein. The tissue paper may be more uniformly wet with the wiping solution and may maintain higher strength. The length of the solution band dispensed may be substantially the same as the length of the stroke that the nozzle end is actuated between nozzle closures. A wiping solution band length may be at least about 2.5 cm, at least about 5 cm, at least about 7 cm, at least about 10 cm or any range between and including the length values provided. Any suitable volume of wiping solution may be dispensed such as at least about 5 ml, at least about 10 ml, at least about 15 ml, at least about 20 ml and any volume between and including the volumes provided.

An exemplary nozzle may comprise a nozzle engagement feature that couples the nozzle to the actuator. A nozzle engagement feature may extend from the nozzle and be secured to an actuator, such as a gear. A nozzle engagement feature may also couple the nozzle with a race, or pair of races, and guide the extended end of the nozzle along the race during actuation. A nozzle engagement feature may be an integral part of the nozzle or may be detachably attached to the nozzle and may comprise an opening for receiving the extended end of the nozzle.

An exemplary motorized dispenser comprises an electric motor having a gear attached thereto. The gear may be coupled with the nozzle or may drive one or more additional gears and the nozzle may be coupled with one of these additional gears. In an exemplary embodiment, a motor drives a first gear that is coupled with and drives a second gear. The second gear may be a pie gear, or a gear that has a portion of a full circular shape. The nozzle is attached to this second gear, or actuator, and is driven back and forth from a first nozzle closure configured at one end of the stroke and to a second nozzle closure configured on a second end of the stroke. As described herein, the nozzle may be attached to the gear or other actuator by a nozzle engagement feature. As the extended end of the nozzle moves from one side of the stroke to the other, a nozzle engagement feature may guide the nozzle along a race. A nozzle engagement feature may comprise protrusions that extend from the nozzle that are configured to extend through a race, or guide slot.

An exemplary motorized dispenser comprises an electric motor that is directly coupled with the nozzle and rotates the nozzle about the drive shaft of the motor across an arc. The end of the nozzle sweeps from one end of the arc segment to the other and dispenses a band of wiping solution. The motor may be a servo-motor, or a motor that can be controlled to move back and forth about an arc, or a partial rotation.

An exemplary wiping solution dispenser may comprise a pump that forces wiping solution into and out of the nozzle from the solution container. The pump may be configured between the nozzle and the solution container and may be controlled by the control system to force wiping solution out of the into and out of the nozzle to dispense a band on wiping solution.

A nozzle closure feature may be a plug or stopper than is sized to fit within the nozzle opening at the extended end of the nozzle. The nozzle may be out of a pliable material, such as a plastic or elastomer and may pop over the nozzle closure or stopper when actuated to the end of a stroke. The solution may be effectively sealed within the nozzle when configured at the end of a stroke with the nozzle closure in the end of the nozzle. A nozzle closure or stopper may be made out of any suitable material including metal, plastic or an elastomer. An exemplary nozzle closure feature may be a closure bar that the nozzle is pressed against or hits to pinch the nozzle closed and prevent leakage through the nozzle opening. A self-sealing valve or nozzle may intersect with a closure element, such as a bar or rod that extends orthogonally to the valve opening length to press it closed proximal the end of the stroke. The combination of the self-sealing valve and a closure feature may provide secure closure of the valve.

The wiping solution is a liquid or gel that is configured to facilitate wiping and/or cleaning after using the bathroom. An exemplary wiping solution may contain natural ingredients that facilitate smooth wiping due to low viscosity and may contain soothing or enriching qualities. An exemplary wiping solution may be a hygiene solution comprising components to cleanse a person after they have used the bathroom. An exemplary wiping solution may comprise any number of components including, but not limited to, water, soap, alcohol, cleansing agents, moisturizing agents, fragrances, anti-viral and anti-bacterial agents, and the like. An exemplary wiping solution has a viscosity of about 1.0 centipoise, or similar to water. The viscosity may be higher however, such as no more than about 2 centipoise, no more than about 10 centipoise, no more than about 40 centipoise, no more than about 100 centipoise, no more than about 1000 centipoise. The viscosity of the wiping solution may be kept below a certain level to ensure a proper gravity feed rate. Centipoise is equal to the product of centistokes and specific gravity.

In an exemplary embodiment, a wiping solution dispenser comprises a motion detector that is coupled with a control system that automatically activates the actuation of the nozzle and dispenses the wiping solution. A motion detector may be configured to detect motion under the base of the housing, such as when a person places toilet paper under the housing and under the outlet opening. The control system may comprise a microprocessor or other control circuit that initiates the actuation of the nozzle from one side of the stroke to the other. A short delay time may be programmed into the control system to ensure that a user has the toilet paper located under the nozzle opening before the solution is dispensed. A motion detector may be a line of sight detector that detects distance and motion of object within a field of view.

An exemplary motion detector may be a color sensor that is specifically configured to detect the white toilet tissue as it is moved under the wiping solution dispenser. An exemplary motion color sensor has an array of photo detectors, each with either a red, green, or blue filter, or no filter (clear). The filters of each color are distributed evenly throughout the array to eliminate location bias among the colors. Internal to the device is an oscillator which produces a square-wave output whose frequency is proportional to the intensity of the chosen color. An exemplary motion color sensor can detect a wide variety of colors based on their wavelength. A motion color sensor configured to detect white may be used to identify when toilet tissue is moved under the dispenser, as toilet tissue is typically white. This type of sensor may eliminate dispensing wiping solution when a person's hand or other objects are inadvertently moved under the wiping solution dispenser. Also, the use of a motion color sensor may eliminate the need for a user interface to dispense the wiping solution, such as a button.

A motion detector may be configured to detect motion and/or color that is within a proximity distance from the detector which may be about 20 cm or less, about 15 cm or less, about 10 cm or less, about 7 cm or less, about 5 cm or less and any range between and including the proximity distances provided. A smaller proximity distance, such as 10 cm or less may prevent unwanted dispensing of the wiping solution. In an exemplary embodiment, a user may move toilet tissue up toward the base of the wiping solution dispenser until the motion and/or color is detected by the motion detector to automatically initiate dispensing of the wiping solution in a band on the toilet tissue.

In an exemplary embodiment, a wiping solution dispenser has an auditory sound, such as a beep, or ring sound that is emitted after the wiping solution has been dispensed. In addition, the dispenser may have a refill light indicator to indicate when the wiping solution is below a threshold level. The refill light may be yellow or red for example and be controlled by the controller, or be coupled directly with a sensor that detects when the wiping solution is below a threshold level.

In an exemplary embodiment, a wiping solution dispenser comprises a payment feature that enable a user to make a payment for the delivery of one or more bands of wiping solution. A payment feature may comprise a money receiver that is configured to receive money, such as coins or paper bills. For example, a user may insert a quarter, or other suitable payment coin, for a single band of wiping solution. A payment feature may comprise a payment card feature, such as a card reader. A card reader may be a card reader slot that a user can swipe their payment card, such a credit, debit or prepaid card, through the slot for payment. Payment may be made through OR communication.

In an exemplary embodiment, a wiping solution dispenser comprises a near field communication transceiver, such as a Bluetooth communication device. The near field communication transceiver may be configured to receive payment instructions from an electronic device or chip located proximal to the wiping solution dispenser. The near field communication transceiver may be coupled with the control system and provide input that a payment has been received and then enable dispensing of the wiping solution. The wiping solution may not be dispensed until the motion detector has been activated after payment. The control system may comprise a dispense time, or an allowable time after payment that the system will dispense wiping solution. A dispense time may be set to no more than about 5 minutes, no more than about 10 minutes and the like. The control system and the near field communication transceiver may be coupled with the internet through any conventional means, such as with a transmission tower, or to a wi-fi system. A wi-fi transceiver may communicated with a rooter which in turn communicates to the internet to verify payment.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

FIG. 13 shows a front view diagram of an exemplary wiping solution dispenser having a motorized dispenser mechanism comprising a gear attached to a motor, a second gear coupled with a dispenser nozzle, and a race configured on either side of the nozzle having the nozzle engagement feature configured therein.

FIG. 14 show a top view of an exemplary nozzle engagement feature.

DETAILED DESCRIPTION OF THE ILLUSTRATED EMBODIMENTS

Figure 1:
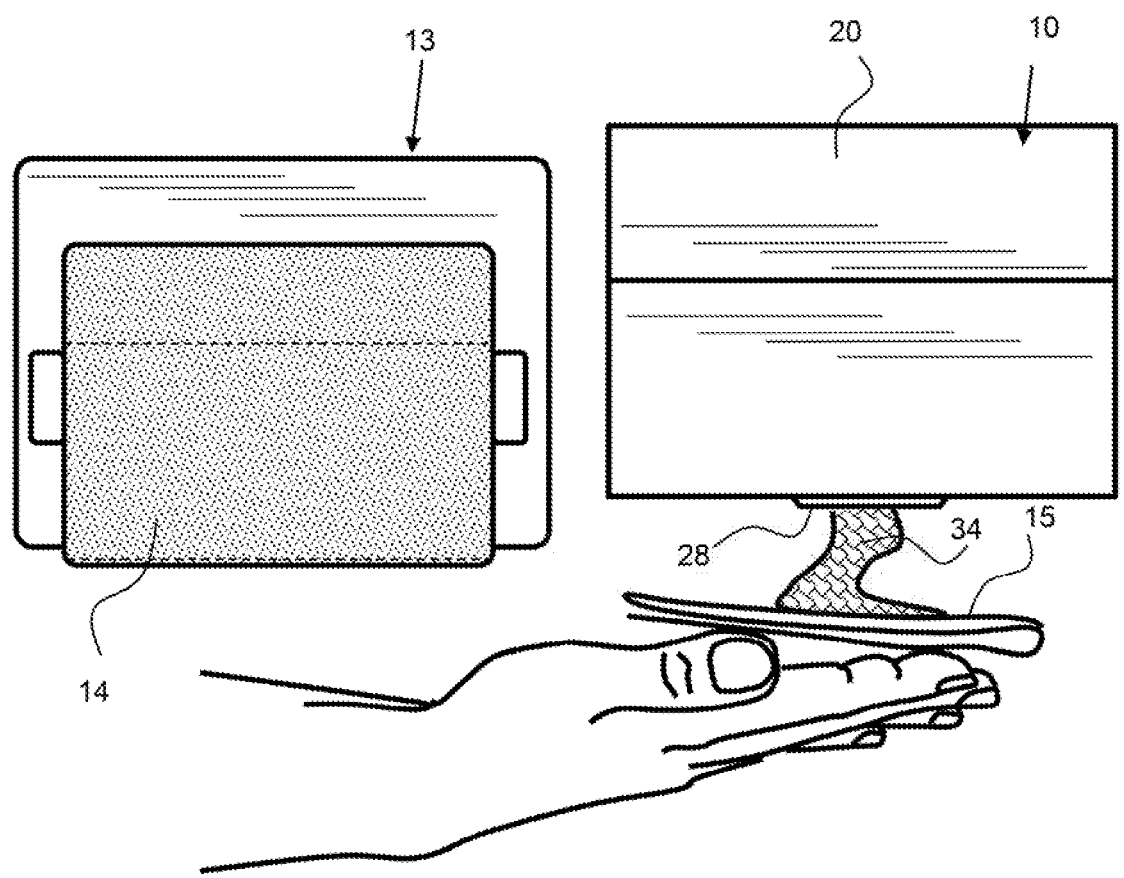
FIG. 1 shows a front view of an exemplary wiping solution dispenser configured next to a toilet paper roll and a band of wiping solution being dispensed onto a wad of toilet paper.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

Definitions

A stroke is a linear stroke wherein the nozzle opening is moved in a substantially straight line back and forth, or an arc stroke, wherein the nozzle opening is moved along an arc from a first end to a second end of the stroke.

As shown in FIG. 1, an exemplary wiping solution dispenser 10 is configured next to a toilet paper roll 14 configured in a toilet paper dispenser 13. A band of wiping solution 34 is being dispensed onto a wad of toilet paper 15 from the outlet opening 28 of the housing 20.

Figure 2:
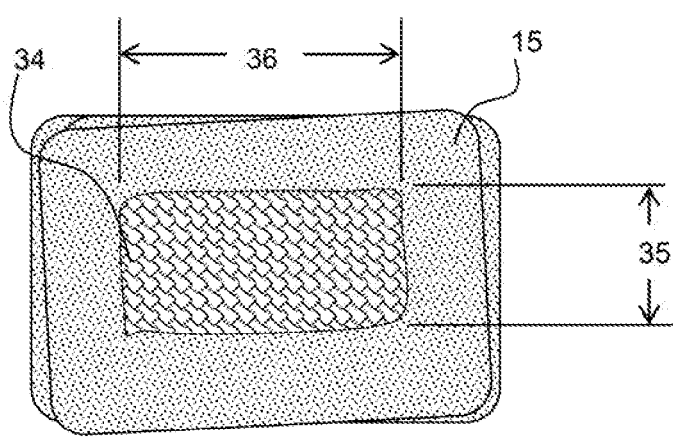
FIG. 2 shows a top-down view of a wad of toilet paper having a wiping solution dispensed thereon.

As shown in FIG. 2, an exemplary band of wiping solution 34 has been dispensed onto toilet paper 15. The band of wiping solution has a width 35 and length 36. As described herein, the wiping solution band may have a width and/or length that is at least about 2.0 cm, at least about 3 cm, at least about 4 cm, at least about 5 cm, at least about 7 cm and any range between and including the wiping solution band dimensions provided. The width and length of the band of wiping solution provides uniform coverage over the toilet or wiping tissue and prevents saturation in a single location.

Figure 3:
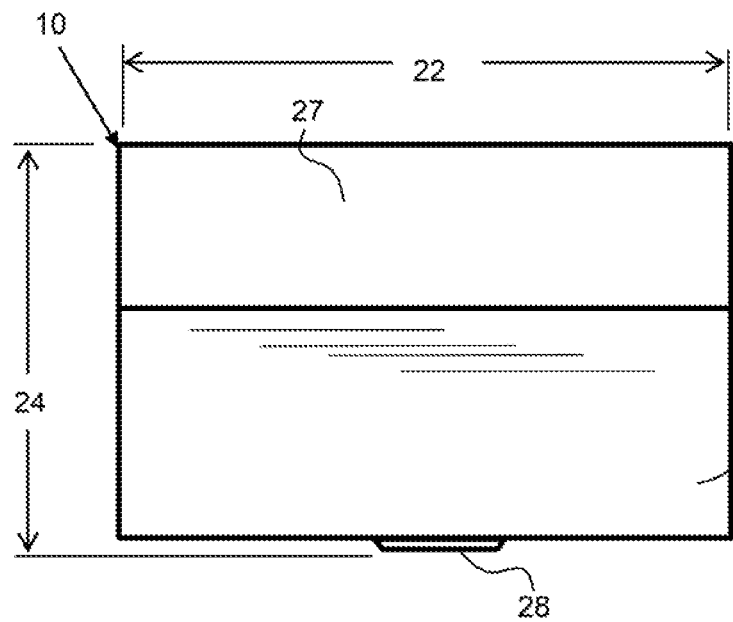
FIG. 3 shows a front view of an exemplary wiping solution dispenser.
Figure 4:
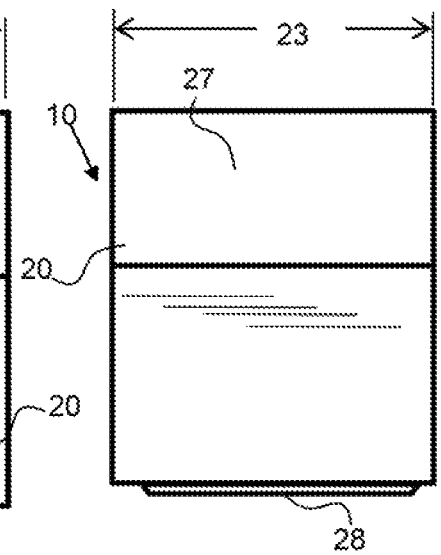
FIG. 4 shows a side view of an exemplary wiping solution dispenser.
Figure 5:
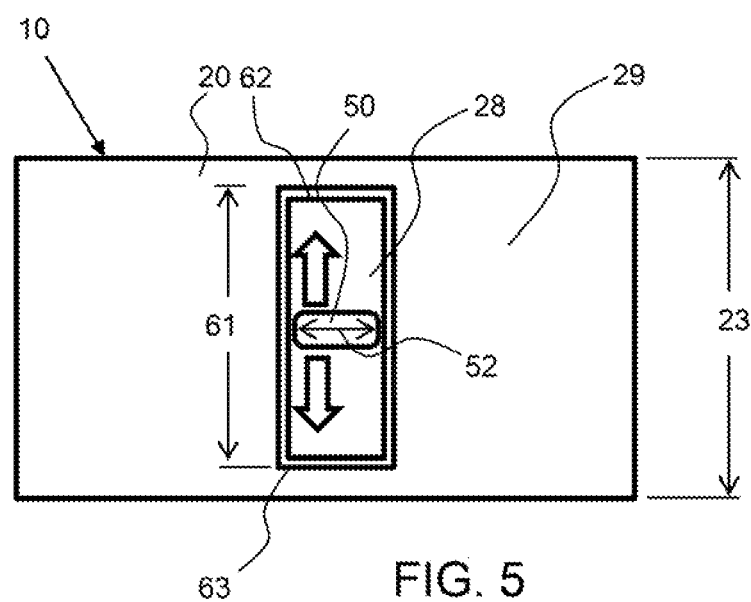
FIG. 5 shows a bottom view of an exemplary wiping solution dispenser having an outlet opening and a nozzle port configured therein.

As shown in FIGS. 3 to 5, an exemplary wiping solution dispenser 10 is configured in a housing 20 having a length 22, width or depth 23, and a height 24, that forms at least in part, a solution receptacle 27 for receiving solution directly or for receiving and containing a solution container. On the base 29 of the housing 20, an outlet opening 28 has a width and length configured to allow dispensing of the band of wiping solution. The nozzle 50 is shown being configured in the outlet opening 28. The nozzle is actuated back and forth from a first end 62 to a second end 63 of a stroke within the outlet opening, or along a stroke having a stroke length 61. The stroke length may be substantially the same as the wiping solution band length and the width of the wiping solution band may be substantially the same as the nozzle opening width 52.

Figure 6:
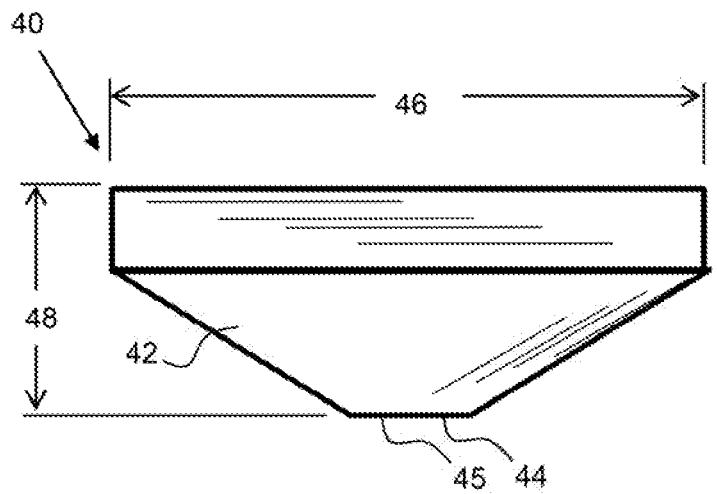
FIG. 6 shows a front view of an exemplary wiping solution container.
Figure 7:
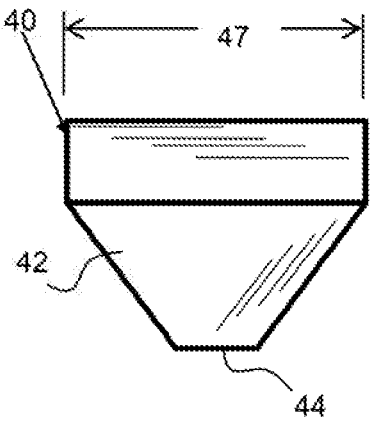
FIG. 7 shows a side view of an exemplary wiping solution container.
Figure 8:
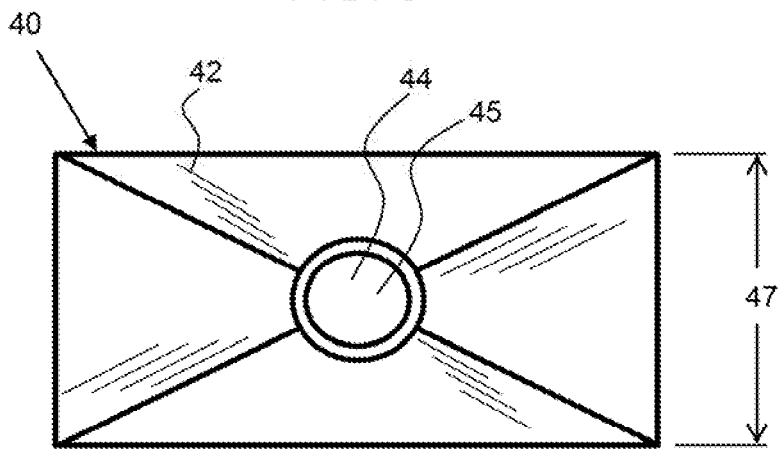
FIG. 8 shows a bottom view of an exemplary wiping solution container having a solution port.

As shown in FIGS. 6 to 8, an exemplary wiping solution container 40 has a length 46, width or depth 47 and height 48. As shown the wiping solution dispenser is a solution carton 42 having a solution port 44 configured to couple with the nozzle (not shown). A solution port 44 may have a frangible cover 45 configured to be punctured when inserted into the solution receptacle 27 within the housing. As described herein, a frangible cover may be a coated paper, or foil or plastic film, combinations thereof and the like.

Figure 9:
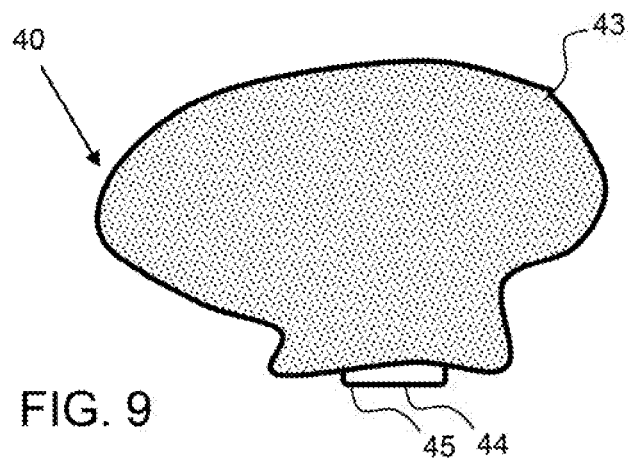
FIG. 9 shows an exemplary wiping solution bag having a solution port attached thereto.

As shown in FIG. 9, an exemplary wiping solution container 40 is a flexible container, such as a bag 43 having a solution port 44 and a frangible cover, such as a film or thin layer of material, such as plastic or metal foil, for example.

Figure 10:
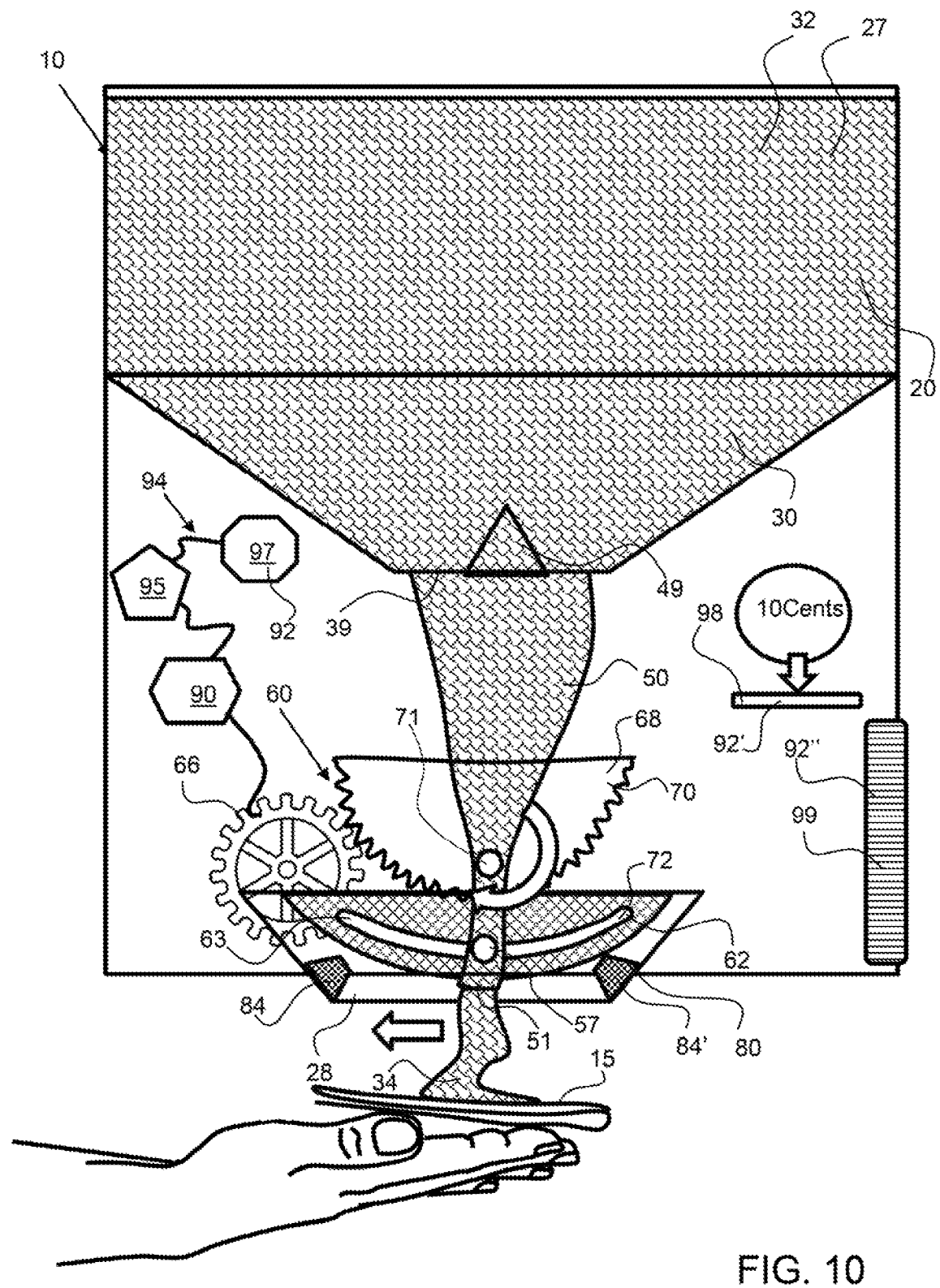
FIG. 10 shows a side view diagram of an exemplary wiping solution dispenser having a motorized dispenser mechanism comprising a gear attached to a motor and a second gear coupled with a dispenser nozzle, and a wiping solution being dispensed from the nozzle port.

As shown in FIG. 10, a band 34 of wiping solution 32 is being dispensed from the nozzle opening 51 onto toilet paper 15. Wiping solution from a wiping solution container 30 flows through the nozzle port 39 and down into the nozzle 50. The nozzle opening enables the wiping solution to gravity feed out when the nozzle opening is between either end of the actuated stroke. As shown in FIG. 10, a motorized dispenser mechanism 60 comprises a first gear 66 attached to a motor, a second gear 68, driven by the first gear, coupled with a dispenser nozzle 50 by an actuator coupling 71, an attachment between the nozzle and the actuator. The nozzle also comprises a nozzle engagement feature 57 that guides the extended end of the nozzle along a race 72. As the first gear rotates it rotates the mating second gear 68 or actuator 70 which, in turn, actuates the extended end of the nozzle from one end to the second end of the stroke. Nozzle stoppers 84, 84' are configured proximal to either end of the stroke to seal the nozzle and prevent wiping solution from leaking. The nozzle stoppers may extend at least partially into the nozzle opening 51.

Figure 11:
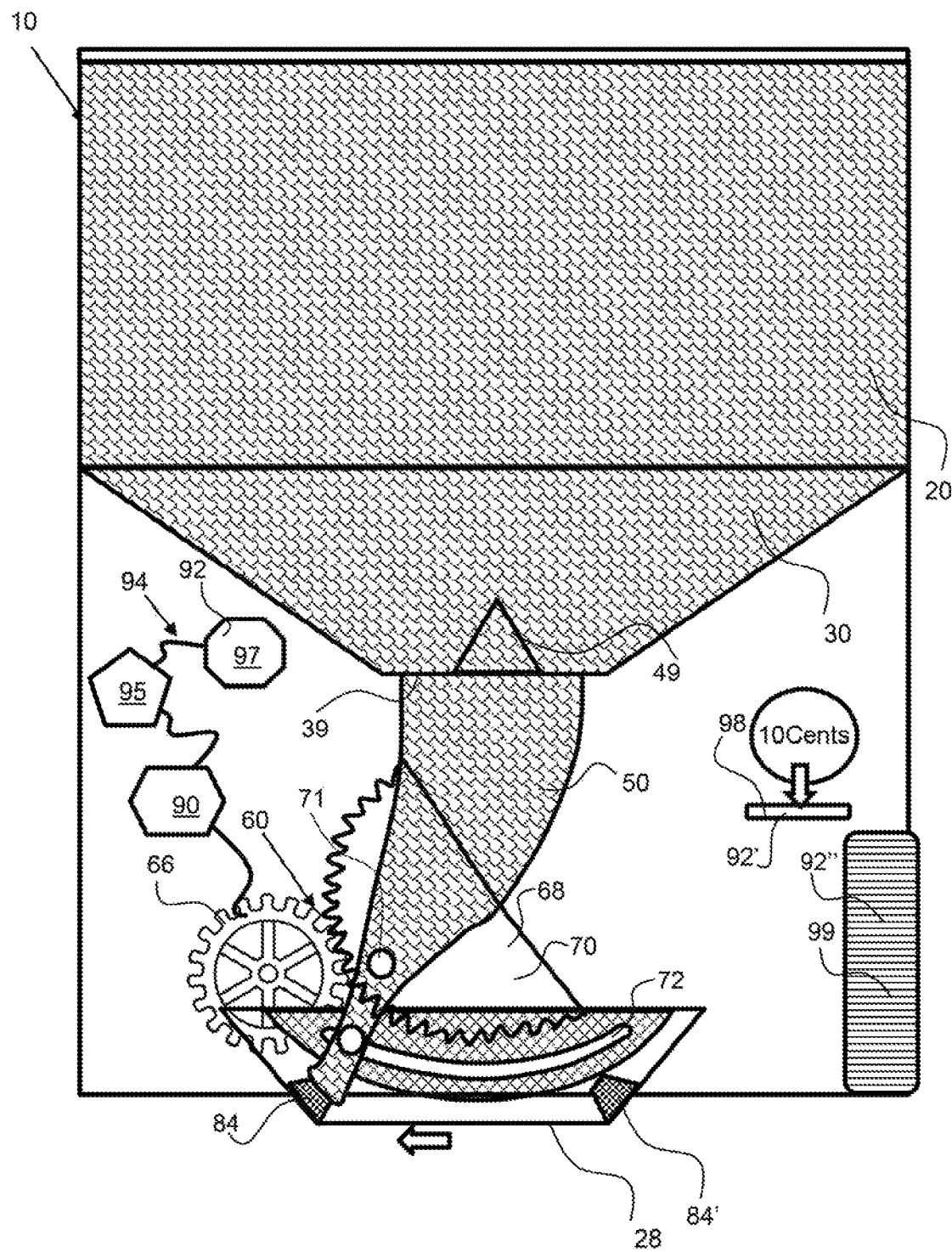
FIG. 11 shows a side view diagram of the exemplary wiping solution dispenser and motorized dispenser mechanism actuated to a closed position, or an end of a dispensing stroke, wherein the nozzle opening is configured over a nozzle closure feature, or stopper.
Figure 12:
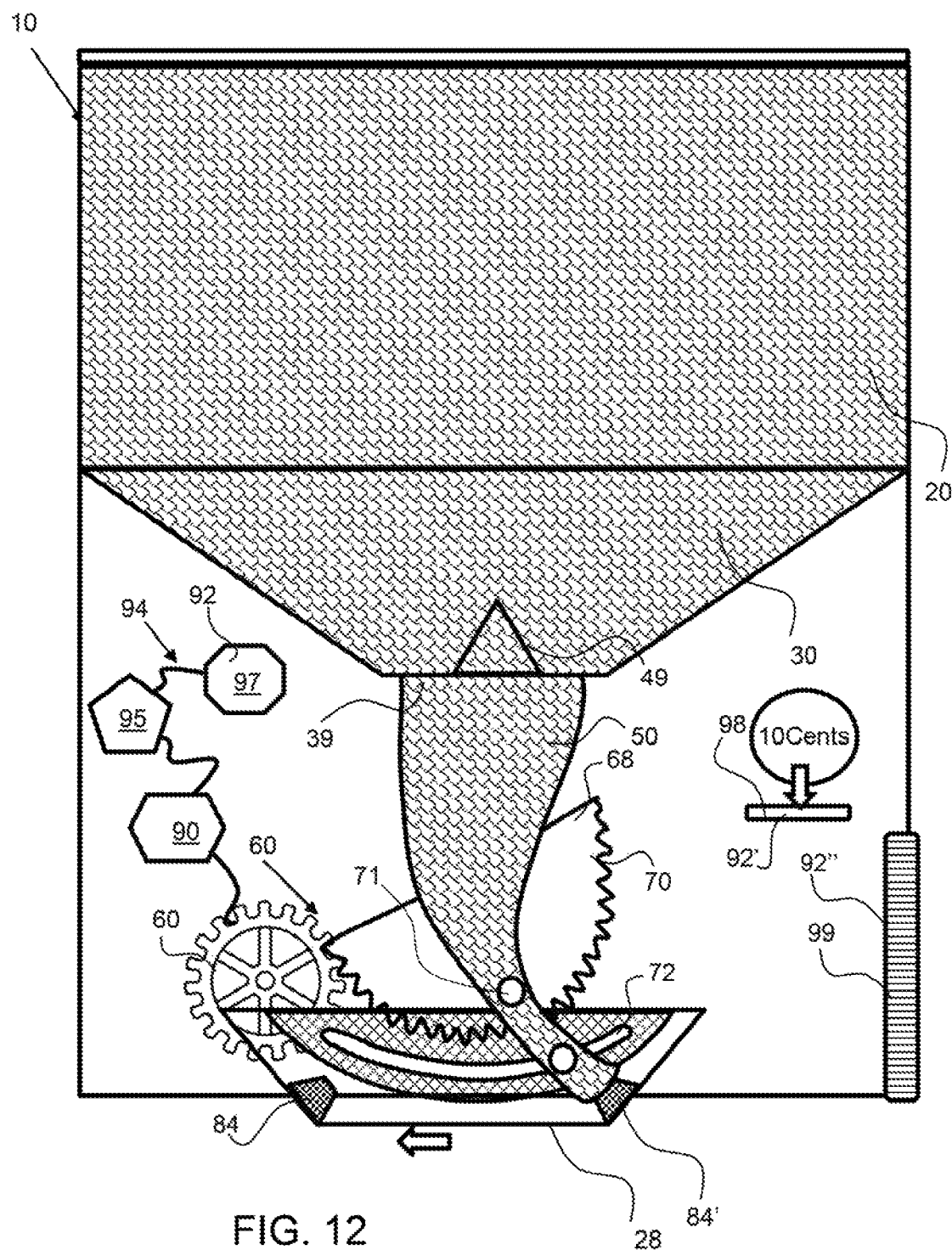
FIG. 12 shows a side view diagram of the exemplary wiping solution dispenser shown in FIG. 11 with and motorized dispenser mechanism actuated to a closed position at the opposite end of the dispensing stroke, wherein the nozzle opening is configured over the nozzle closure feature.

As shown in FIG. 10 to 12, the exemplary wiping solution dispenser 10 comprises a plurality of payment features 92-92" for receiving payment before the dispenser will dispense a band of wiping solution. Payment feature 92 is a near field communication device, such as a Bluetooth device, that communicates with an electronic device or chip to receive payment. Payment feature 92' is money receiver 98 that accepts a coin but it is to be understood that a paper bills may also be received by a money receiver. Payment feature 92" is a card reader 99 that provides a means to read a payment card, such as a credit or debit card or prepaid card. It is to be understood that a wiping solution dispenser may comprise one or more of the payment features described herein. The motion detector 90 shown in FIGS. 10 to 12 and 16, may be configured proximal to the base of the housing for detecting motion and/or color within a proximity distance. It is shown offset from the base for clarity of dispensing mechanism.

As shown in FIG. 11, the exemplary wiping solution dispenser 10 shown in FIG. 10 has been actuated to a first stroke end, wherein the nozzle end 51 is sealed by a closure stopper 84 extending into the nozzle end.

As shown in FIG. 12, the exemplary wiping solution dispenser 10 has been actuated to the opposing stroke end and the nozzle end is sealed by a second closure stopper 84', shown in FIG. 11 with and motorized dispenser mechanism actuated to a closed position at the opposite end of the dispensing stroke, wherein the nozzle opening is configured over the nozzle closure feature 80.

As shown in FIG. 13, an exemplary wiping solution dispenser 10 has a motorized dispenser mechanism 60 comprising a first gear 66 attached to a motor 64, a second gear 68 that is driven by the first gear and also coupled with a dispenser nozzle 50. The nozzle engagement feature 57 extends into a race 72, 72' on either side of the nozzle 50. The race is a slot that guides the end of the nozzle between the closure stoppers wherein it dispensed a band of wiping solution.

As shown in FIG. 14, an exemplary nozzle engagement feature 57 has extended ends configured for coupling with the races and securing the nozzle as it is guided along the races. The nozzle engagement feature 57 has an opening for receiving the extended end of the nozzle. A nozzle engagement feature may be attached to the nozzle, such as a one-piece unit, or it may be a detachable component from the nozzle. The width 52 and depth 53 of the nozzle opening in shown in FIG. 14.

Figure 15:
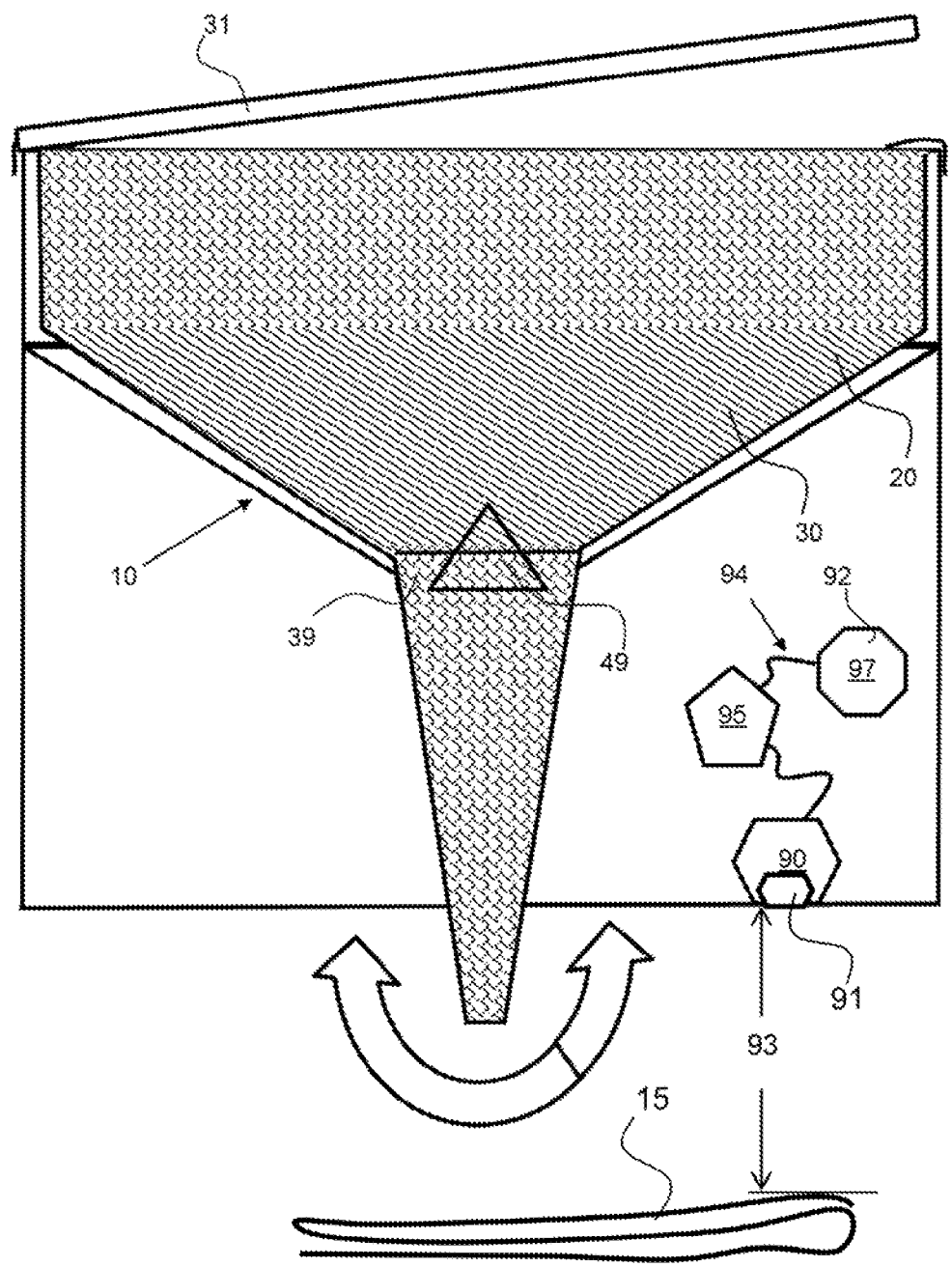
FIG. 15 shows a front view diagram of an exemplary wiping solution dispenser having a puncture feature configured in the nozzle port, a near field communication transceiver and a motion detector.

As shown in FIG. 15, an exemplary wiping solution dispenser 10 has a puncture feature 49 configured in the nozzle port 39 to initiate the flow of wiping solution into the nozzle. A lid 31 enables insertion of a solution container 30 into the housing 20. In addition, the exemplary wiping solution dispenser 10 has a motion detector 90 that is configured to detect when someone places toilet tissue under the housing to receive a band of wiping solution. As described herein, the motion detector may comprise a color sensor 91 configured to detect the color white, within a proximity distance 93 from the sensor. Furthermore, the exemplary wiping solution dispenser 10 has a near field communication transceiver that is configured to receive a payment and activate the wiping solution dispenser to dispense a band of wiping solution. For example, a near field communication transceiver 97 may receive payment from a person's cellular phone and then communicate this to a microprocessor 95 that then enables dispensing when the motion detector detects a suitable motion.

Figure 16:
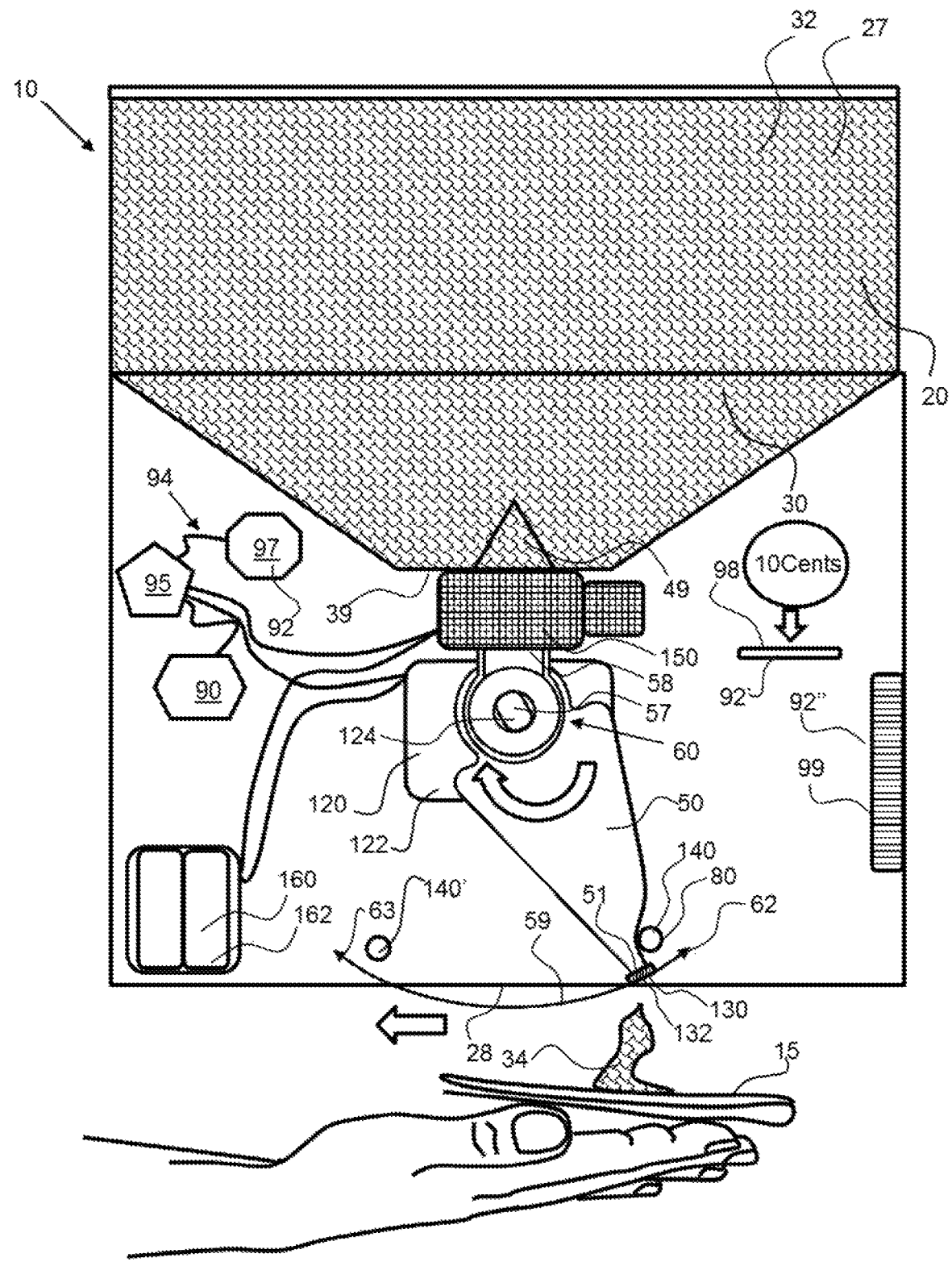
FIG. 16 shows a side view diagram of an exemplary wiping solution dispenser and motorized dispenser mechanism that actuates the nozzle about an arc segment stroke.

As shown in FIG. 16 shows an exemplary wiping solution dispenser 10 comprises a pump 150 configured to pump wiping solution from the solution container 30 into the nozzle 50. The pump is configured between the solution container and the nozzle and forces wiping solution 32 into and out of the nozzle. The nozzle has a nozzle inlet 58 for receiving a flow of wiping solution 32 from the pump and the nozzle has an interior volume to allow the wiping solution to flow through and out of the nozzle opening 51. A self-sealing valve 130 is coupled to the nozzle opening 51 and comprises an elastomeric material, such as silicone, or urethane that squeezes and opening closed until the pressure of the wiping solution within the nozzle forces the opening of the self-sealing valve open to dispense the wiping solution. A closure feature 80 such as a closure bar 140 is configured at the end of the stroke of the arc segment to intersect with the valve proximal the valve opening 132 to promote closure of the valve opening and leakage of wiping solution 34 therefrom. Note that a closure bar 140, 140' may be configured on both sides of the arc. The nozzle 50 is coupled with and driven by a motor 120, such as a servo motor 122. The drive shaft 124 of the motor is coupled with the nozzle and rotates the nozzle about a pivot, the drive shaft, to dispense a wiping solution band 34 as the nozzle opening is traversed along the arc segment 59, as shown by the bold double arrow curved line. The stroke distance is the length of the arc segment 59, as shown. The motor and the pump are coupled with the control system 94 as well as a power supply 160, a battery 162. The motor is a direct drive motor, in that it moves the nozzle directly with nozzle engagement feature 57 attached to the drive shaft.

Figure 17:
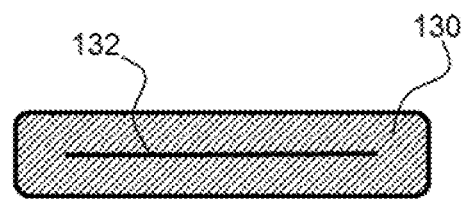
FIG. 17 shows an end view of an exemplary valve in a closed orientation with the opening sealed.
Figure 18:
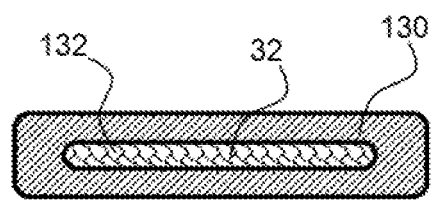
FIG. 18 shows an end view of an exemplary valve in an open orientation with the opening spread apart to allow the wiping solution to be dispensed.

Referring now to FIGS. 17 and 18, an exemplary self-sealing valve 130 has an opening 132 the is squeezed closed until the pressure of the wiping solution forces the opening open. As shown in FIG. 17, the opening is closed and in FIG. 18, the opening is opened by the pressure of the wiping solution 32.

Figure 19:
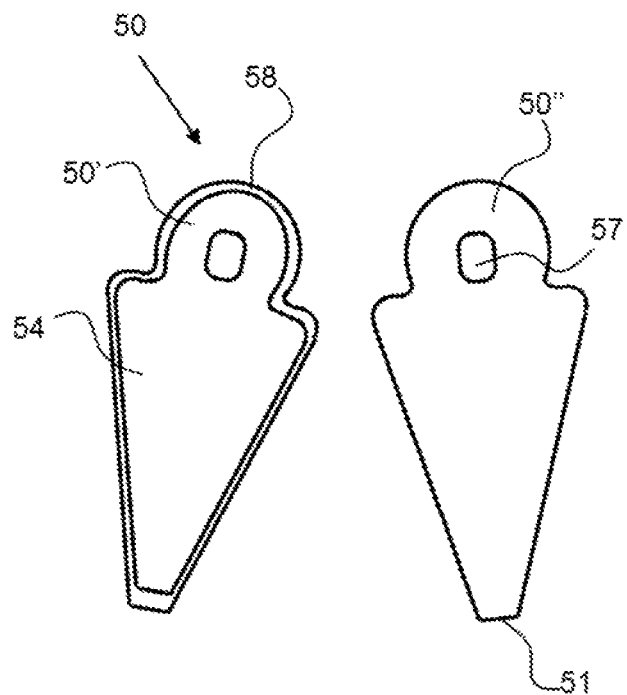
FIG. 19 shows an exemplary nozzle having a clam-shell design.
Figure 20:
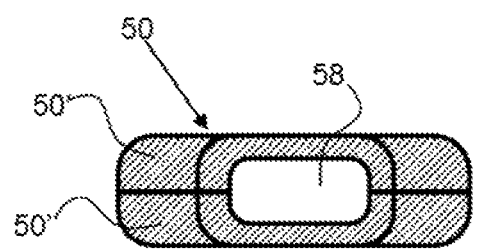
FIG. 20 shows a top view of the exemplary nozzle shown in FIG. 19 having a nozzle inlet.

Referring now to FIGS. 19 and 20, an exemplary nozzle 50 has a clam-shell design wherein a first nozzle portion 50' and second nozzle portion 50" are coupled together to form said nozzle having an interior volume 54. The second nozzle portion 50" has an engagement feature, a recess, for coupling with a drive shaft of a motor. As shown in FIG. 20, a nozzle inlet 58 is configured in the top of the nozzle to receive wiping solution into the interior volume of the nozzle. The nozzle inlet may be coupled with a pump, as shown in FIG. 16 to receive wiping solution that in pumped into the nozzle by the pump.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A wiping solution band dispenser comprising:
   a) a housing;
   b) an internal receptacle having a volume within the housing for receiving a wiping solution;
   c) an outlet opening configured in a base of the housing;
   d) a nozzle configured to receive said wiping solution and comprising:
      i) a nozzle opening;
      ii) a nozzle engagement feature;
      iii) a valve having a valve opening that, in an opening configuration, allows the wiping solution to be dispensed and, in a closed configuration, to seals the wiping solution in the nozzle;
   e) a motorized dispenser mechanism configured to move the nozzle back and forth a stroke having a stroke distance from a first end to a second end and comprising:
      i) a motor;
      wherein the solution band dispenser dispenses a band of solution from said nozzle opening to form a solution band having a solution band width that is at least 2.5 cm and a solution band length that is at least 2.5 cm; and
   f) a motion detector, wherein the solution is dispensed automatically when the motion detector detects motion, wherein the motion detector is configured to detect motion below the base of the housing,
wherein the solution is gravity dispensed through said nozzle opening between the first and second end of said stroke distance.

2. The wiping solution band dispenser of claim 1, wherein the wiping solution is configured within a solution container configured to fit within the internal receptacle of the housing.

3. The wiping solution band dispenser of claim 2, further comprising a solution container piercing feature configured on an inside surface of housing, whereby placement of the solution container within the housing punctures said solution container.

4. The wiping solution band dispenser of claim 3, wherein the solution container piercing feature is configured within a nozzle port.

5. The wiping solution band dispenser of claim 1, further comprising a closure feature configured proximal the end of the stroke and configured to intersect the nozzle to close said valve and seal the wiping solution in the nozzle.

6. A wiping solution band dispenser comprising:
a) a housing;
b) an internal receptacle having a volume within the housing for receiving a wiping solution;
c) an outlet opening configured in a base of the housing;
d) a nozzle configured to receive said wiping solution and comprising:
i) a nozzle opening;
ii) a nozzle engagement feature;
iii) a valve having a valve opening that, in an opening configuration, allows the wiping solution to be dispensed and, in a closed configuration, to seals the wiping solution in the nozzle;
e) a motorized dispenser mechanism configured to move the nozzle back and forth a stroke having a stroke distance from a first end to a second end and comprising:
i) a motor;
wherein the solution band dispenser dispenses a band of solution from said nozzle opening to form a solution band having a solution band width that is at least 2.5 cm and a solution band length that is at least 2.5 cm; and
f) a motion detector, wherein the solution is dispensed automatically when the motion detector detects motion, wherein the motion detector is configured to detect motion below the base of the housing;
g) a pump to pump the wining solution from the nozzle: wherein the valve is a self-sealing valve requiring a pressure of wiping solution pumped by said pump in the nozzle to open the valve and wherein when the solution is not being pumped, the nozzle automatically seals
h) a closure feature configured proximal the end of the stroke and configured to intersect the nozzle to close said valve and seal the wiping solution in the nozzle.

7. The solution band dispenser of claim 1, wherein the nozzle is an integral part of the solution container.

8. The wiping solution band dispenser of claim 1, wherein the motorized dispenser mechanism comprises an actuator and wherein the nozzle is detachably attached to the actuator by the nozzle engagement feature.

9. The wiping solution band dispenser of claim 1, wherein the motorized dispenser mechanism comprises a first gear coupled with the motor and a second gear coupled with the actuator.

10. The wiping solution band dispenser of claim 9, wherein the second gear is a pie gear.

11. A wiping solution band dispenser comprising:
a) a housing;
b) an internal receptacle having a volume within the housing for receiving a wiping solution;
c) an outlet opening configured in a base of the housing;
d) a nozzle configured to receive said wiping solution and comprising:
i) a nozzle opening;
ii) a nozzle engagement feature;
iii) a valve having a valve opening that, in an opening configuration, allows the wiping solution to be dispensed and, in a closed configuration, to seals the wiping solution in the nozzle;
e) a motorized dispenser mechanism configured to move the nozzle back and forth a stroke having a stroke distance from a first end to a second end and comprising:
i) a motor;
wherein the solution band dispenser dispenses a band of solution from said nozzle opening to form a solution band having a solution band width that is at least 2.5 cm and a solution band length that is at least 2.5 cm; and
f) a motion detector, wherein the solution is dispensed automatically when the motion detector detects motion, wherein the motion detector is configured to detect motion below the base of the housing further comprising a race, wherein the nozzle is actuated along said race when the motorized dispenser mechanism moves the nozzle back and forth a stroke distance.

12. The wiping solution band dispenser of claim 1, wherein the motorized dispenser mechanism is a direct-drive mechanism, wherein the motor comprises a drive shaft and wherein the nozzle is coupled to the drive shaft and rotates about the drive shaft said stroke distance.

13. The wiping solution band dispenser of claim 1, wherein the motion detector, is a color sensor configured to detect white objects.

14. The wiping solution band dispenser of claim 13, wherein the color sensor is configured to detect white objects within a proximity distance of 15 cm or less.

15. The wiping solution band dispenser of claim 1, further comprising payment feature, wherein a payment must be received by said payment feature before a band of wiping solution is dispensed.

16. The wiping solution band dispenser of claim 15, wherein the payment feature comprises a near field communication transceiver configured to receive payment wirelessly from an electronic device that is held in proximity to said near field communication transceiver.

17. A wiping solution band dispenser of claim 1,
wherein the wiping solution is configured within a solution container configured to fit within the internal receptacle of the housing; and further comprising a solution container piercing feature configured on an inside surface of housing, whereby placement of the solution container within the housing punctures said solution container.

* * * * *